A. McDONALD.
PLUG FOR LUBRICATOR CUPS.
APPLICATION FILED APR. 3, 1908.
No. 904,554. Patented Nov. 24, 1908.
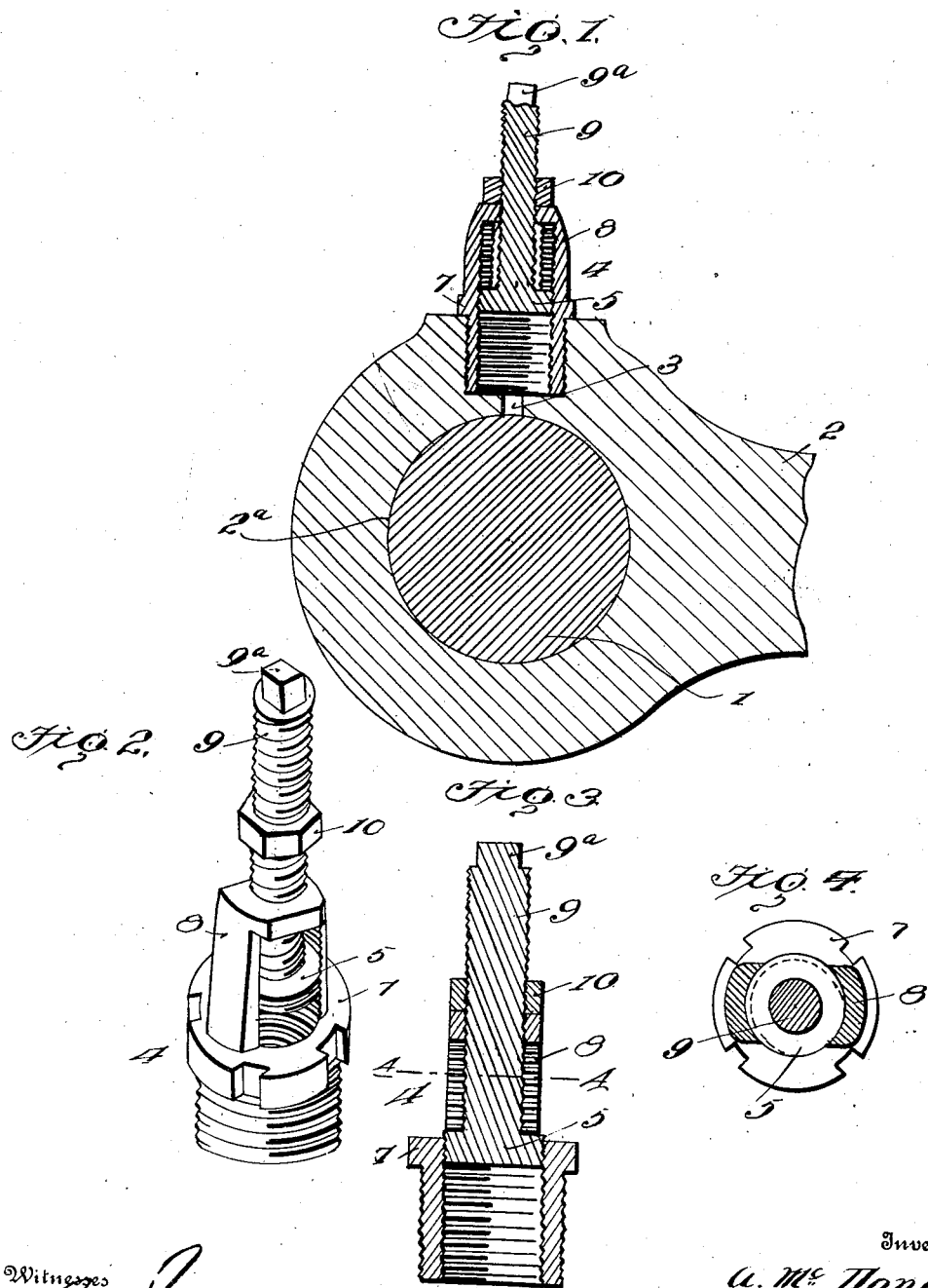

UNITED STATES PATENT OFFICE.

AL McDONALD, OF DALHART, TEXAS.

PLUG FOR LUBRICATOR-CUPS.

No. 904,554.

Specification of Letters Patent.

Patented Nov. 24, 1908.

Application filed April 3, 1908. Serial No. 424,989.

*To all whom it may concern:*

Be it known that I, AL McDONALD, a citizen of the United States, residing at Dalhart, in the county of Dallam and State of Texas, have invented certain new and useful Improvements in Plugs for Lubricator-Cups, of which the following is a specification.

The object of the present invention is the provision of a novel means for preventing the loss of plugs from lubricator cups such as are commonly employed in connection with the rods connected to crank pins.

A further object of the invention is the provision of a lubricator cup embodying a novel construction whereby the same can be readily placed in position or removed therefrom and the plug can be adjusted as required.

For a full understanding of the invention and the merits thereof and also to acquire a knowledge of the details of construction and the means for effecting the result, reference is to be had to the following description and accompanying drawings, in which:

Figure 1 is a sectional view showing the improved lubricator cup applied. Fig. 2 is a detached perspective view of the lubricator cup. Fig. 3 is a longitudinal sectional view through the same. Fig. 4 is a transverse sectional view on the line 4—4 of Fig. 3.

Corresponding and like parts are referred to in the following description and indicated in all the views of the drawings by the same reference characters.

Referring to the drawing, the numeral 1 designates a crank pin and 2 a rod which is provided at one end with an eye $2^a$ loosely receiving the crank pin. An opening 3 is formed in one side of the eye to admit of applying lubricant to the crank pin, and the outer portion of the opening is enlarged and internally threaded to receive an oil cup 4. This cup 4 is in the nature of a sleeve which is externally threaded so as to be screwed within the opening 3 and internally threaded to receive the plug 5.

An exterior shoulder 7 is provided at the outer end of the oil cup and engages the eye $2^a$ to limit the inward movement of the cup when being threaded in position. A yoke 8 projects from the outer end of the cup and the sides of the yoke have the inner faces thereof threaded to correspond to the threaded interior of the cup so that the plug 5 can be turned outwardly beyond the mouth of the cup. Projecting from this plug 5 is a stem 9 which has a threaded engagement with the yoke and has the extremity thereof given a square or angular formation as at $9^a$ to admit of engagement by a wrench for adjusting the plug. It will also be observed that a jam nut 10 is arranged upon the stem 9, and the said jam nut is adapted to be turned against the yoke so as to lock the plug securely in an adjusted position. With this construction it will be obvious that the plug 5 can only be removed through the inner end of the oil cup and is securely held against accidental loss when the cup is in position. It will also be apparent that when the plug is moved outwardly between the arms of the yoke 8 access can be readily had to the cup to place grease or lubricant therein, and the said lubricant will be forced through the feed opening 3 when the plug is moved inwardly.

Having thus described the invention, what is claimed as new is:

1. In a device of the character described, the combination of a lubricator cup, a yoke upon the cup, a plug having a threaded engagement with the interior of the cup, and a stem projecting from the plug and having a threaded engagement with the yoke.

2. In a device of the character described, the combination of a lubricator cup, a yoke upon the lubricator cup, the arms of the yoke and the interior of the cup being correspondingly threaded, a plug engaging the threads of the lubricator cup and yoke, and means for turning the plug.

3. In a device of the character described, the combination of a lubricator cup, a yoke upon the cup, the arms of the yoke and the interior of the cup being correspondingly threaded, a plug engaging the threads of the cup and yoke, a stem projecting from the plug and having a threaded engagement with the yoke, and a jam nut upon the stem.

In testimony whereof I affix my signature in presence of two witnesses.

AL McDONALD. [L. S.]

Witnesses:
 R. C. BALAAM,
 D. B. HILL.